Patented May 22, 1923.

1,455,809

UNITED STATES PATENT OFFICE.

JOSEPH RITTER, OF PITTSBURGH, PENNSYLVANIA, ASSIGNOR TO WHITAKER-GLESSNER COMPANY, OF WHEELING, WEST VIRGINIA, A CORPORATION OF WEST VIRGINIA.

ELASTIC GASKET COMPOSITION.

No Drawing. Application filed January 7, 1922. Serial No. 527,715.

*To all whom it may concern:*

Be it known that I, JOSEPH RITTER, a citizen of the United States of America, and resident of Pittsburgh, county of Allegheny, and State of Pennsylvania, have invented certain new and useful Improvements in Elastic Gasket Compositions, of which the following is a specification.

The primary object of this invention is the provision of a plastic composition adapted for use in the production of adhesive gaskets for sealing covers on sheet metal kegs and cans of the character commonly employed as containers for white lead, oils, paints, and the like.

A further object is to provide an adhesive composition for the purpose mentioned which possesses, when applied, a condition or state of extreme tackiness, and which, following application, permanently possesses an elastic gumminess that serves to tenaciously maintain the requisite close or intimate sealing relation between a can and its cover.

A still further object is the production of a composition of the character mentioned which is not affected by oils, turpentine, gasoline, paints, or any of the usual ingredients of paints, and which is therefore admirably adapted for use in sealing containers for white lead, paints and the like.

My composition consists of a mixture of glycerine, glue, castor oil, paraffine, varnish and water, to which may be added a small quantity of a preservative, such as borax.

In preparing the composition the various ingredients, except the glycerine, are uniformly employed in about the following proportions:

|  | Pounds. |
|---|---|
| Glue | 32 |
| Varnish | 1½ |
| Castor oil | 2 |
| Paraffine wax | 1 |
| Borax | 1 |
| Water | 14 |

The proportions of glycerine employed may vary between 32 pounds and 96 pounds according to the mean atmospheric temperature to which the composition is likely to be subjected, the smaller proportion being suited to very high temperatures and the larger proportion to extremely low temperatures.

In producing the composition the glycerine and water are first introduced together in a steam-jacketed glue-pot or kettle and are heated to or slightly above the melting point of the glue, as to about 120° F., and are subjected to constant stirring. When a temperature approximating 120° F. is reached, the remaining ingredients are added and the stirring continued until all are melted and intimately mixed together, whereupon the composition is ready for use, the same being ordinarily applied to the can covers by pouring into the usual channels or grooves of the latter provided for the reception of the upper edge of the container.

The composition during periods in which it is being applied is kept warm, or at a temperature at which it may be flowed into place, but special care must be exercised at all times, both in the preparation of the composition and following said preparation, that the temperature be not allowed to reach the boiling point.

The composition prepared as aforesaid will keep indefinitely and unused batches thereof may be added to and worked up with new batches prepared as hereinbefore described.

While the composition preferably includes borax and paraffine, as stated, it will be understood that either or both of these ingredients may, in some instances, be omitted without impairing the efficiency of the composition for performing its stated function.

I claim:

1. An elastic gasket composition adapted for use in sealing covers on metal containers, comprising comparatively large proportions of glycerin and glue and comparatively small proportions of varnish and a vegetable oil, the proportion of glycerin at least equaling that of the glue.

2. An elastic gasket composition adapted for use in sealing covers on metal containers, comprising comparatively large proportions of glycerin and glue and comparatively small proportions of paraffine, varnish and a vegetable oil, the proportion of glycerin at least equaling that of the glue.

3. An elastic gasket composition adapted for use in sealing covers on metal containers, comprising comparatively large proportions of glycerin and glue and comparatively small proportions of varnish, a vegetable oil and a preservative, the proportion of glycerin at least equaling that of the glue.

4. An elastic gasket composition adapted for use in sealing covers on containers, comprising an intimate mixture of the following ingredients combined with a suitable quantity of water in about the proportions named:

|  | Pounds. |
|---|---|
| Glycerine | 32 to 96 |
| Glue | 32 |
| Castor oil | 2 |
| Varnish | 1½ |
| Paraffine wax | 1 |
| Borax | 1 |

In testimony whereof, I affix my signature in presence of two subscribing witnesses.

JOSEPH RITTER.

Witnesses:
 GEORGE COLUMBUS, Jr.,
 STANLEY ORZECHOWSKI.